United States Patent
Zhu et al.

(10) Patent No.: US 12,111,250 B2
(45) Date of Patent: Oct. 8, 2024

(54) ON-CHIP INTEGRATED CELL PHONE SPECTROMETER AND CELL PHONE

(71) Applicant: SOOCHOW UNIVERSITY, Suzhou (CN)

(72) Inventors: Jiacheng Zhu, Suzhou (CN); Weiqi Lu, Suzhou (CN); Xinhua Chen, Suzhou (CN); Jiankang Zhou, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 141 days.

(21) Appl. No.: 17/908,269

(22) PCT Filed: Aug. 23, 2021

(86) PCT No.: PCT/CN2021/113940
§ 371 (c)(1),
(2) Date: Aug. 31, 2022

(87) PCT Pub. No.: WO2023/004904
PCT Pub. Date: Feb. 2, 2023

(65) Prior Publication Data
US 2023/0280268 A1   Sep. 7, 2023

(30) Foreign Application Priority Data

Jul. 27, 2021  (CN) .......................... 202110851317.6

(51) Int. Cl.
*G01N 21/31* (2006.01)
*G02B 5/20* (2006.01)
*H04M 1/21* (2006.01)

(52) U.S. Cl.
CPC ............. *G01N 21/31* (2013.01); *G02B 5/201* (2013.01); *G01N 2201/0221* (2013.01); *H04M 1/21* (2013.01)

(58) Field of Classification Search
CPC .............................. G01J 3/0272; G01J 3/0256
See application file for complete search history.

(56) References Cited

U.S. PATENT DOCUMENTS

| | | | |
|---|---|---|---|
| 2019/0049296 A1* | 2/2019 | Cho | ........................ G01J 3/0256 |
| 2019/0056269 A1 | 2/2019 | Liu et al. | |
| 2019/0079004 A1* | 3/2019 | Ulanch | .................. G01J 3/2823 |

FOREIGN PATENT DOCUMENTS

| CN | 104062007 A | 9/2014 |
|---|---|---|
| CN | 206235769 U | 6/2017 |

(Continued)

*Primary Examiner* — Hina F Ayub
(74) *Attorney, Agent, or Firm* — SZDC Law PC

(57) ABSTRACT

The present invention provides an on-chip integrated cell phone spectrometer and a cell phone. The spectrometer includes: a detection system, including a cell phone lens and a focal plane detector integrated with a Bayer filter; and a spectral filter array, integrated at an edge of the Bayer filter, the spectral filter array including a plurality of filtering channels with different spectral transmittances, each filtering channel corresponding to one or more detector pixels, where the cell phone lens is configured to acquire a reflected light from an object under test, the focal plane detector is configured to acquire an intensity signal of the reflected light, and after different intensity signals corresponding to different filtering channels are obtained, a data processing system performs spectral reconstruction to obtain spectral data of the object under test.

8 Claims, 4 Drawing Sheets

(56) References Cited

FOREIGN PATENT DOCUMENTS

| CN | 111458028 A | 7/2020 |
|----|-------------|--------|
| CN | 111579497 A | 8/2020 |

* cited by examiner

FIG. 6

ON-CHIP INTEGRATED CELL PHONE SPECTROMETER AND CELL PHONE

This application is the National Stage Application of PCT/CN2021/113940, filed on Aug. 23, 2021, which claims priority to Chinese Patent Application No. 202110851317.6, filed on Jul. 27, 2021, which is incorporated by reference for all purposes as if fully set forth herein.

FIELD OF THE INVENTION

The present invention relates to the field of spectrometer technologies, and in particular, to an on-chip integrated cell phone spectrometer and a cell phone.

DESCRIPTION OF THE RELATED ART

A spectrometer can measure the spectral information of an object under test by obtaining a light reflected or emitted from the surface of the object to find out the composition and proportion of a substance contained in the object, and is commonly used in fields such as environmental pollution, food hygiene, authenticity identification, light source detection, and mineral exploration. A conventional spectrometer is bulky and expensive, is often used in laboratories, production plants, and other specific scenarios, and is very inconvenient to carry. This seriously limits the promotion and application of spectrometers in daily life. With the continuous improvement of living standards, people pay more and more attention to food safety, drug quality, freshness of fruits and vegetables, and the like. With the advent of the mobile Internet era, mobile devices represented by smartphones have developed into intelligent data terminals, and various devices and functions combined with cell phones have been launched continuously. How to equip a smartphone with a miniature spectrometer that has the ability to detect the authenticity and quality of food and items has become a problem that R&D personnel need to resolve.

At present, researchers at home and abroad have started to develop spectrometer modules for smartphones, such as those in CN111458028A, CN104062007A, CN206235769U, CN211955212U, CN213091491U, U.S. Pat. No. 10,983,002B2, US2009227287A1, and the like. However, in most existing solutions of cell phone spectrometers, a miniature spectrometer device needs to be connected externally in front of a lens of a cell phone, or an additional accessory needs to be added inside a cell phone. In the method using an external device, a user still needs to carry an additional spectrometer device. Despite the small size and light weight of the miniature spectrometer device, the method still fails to provide adequate portability, and it is still difficult to implement detection anywhere and anytime. In the method of adding an additional accessory inside a cell phone, the portability has been greatly improved, but the power consumption and cost of the cell phone are increased, and the aesthetics is affected.

SUMMARY OF THE INVENTION

A technical problem to be resolved by the present invention is to provide an on-chip integrated cell phone spectrometer that has a high level of integration, a fast response speed, and a good spectral resolution.

To resolve the foregoing problem, the present invention provides an on-chip integrated cell phone spectrometer, including:

a detection system, including a cell phone lens and a focal plane detector integrated with a Bayer filter; and a spectral filter array, integrated at an edge of the Bayer filter, the spectral filter array including a plurality of filtering channels with different spectral transmittances, each filtering channel corresponding to one or more detector pixels, where the cell phone lens is configured to acquire a reflected light from an object under test, the focal plane detector is configured to acquire an intensity signal of the reflected light ray, and after different intensity signals corresponding to different filtering channels are obtained, a data processing system performs spectral reconstruction to obtain spectral data of the object under test.

As a further improvement to the present invention, the spectral reconstruction includes the following steps:

S1. measuring a spectral filter transmittance, a transmittance of an $n^{th}$ filtering channel being Tn, Tn being a function of a transmittance with respect to a wavelength, performing sampling at equal wavelength intervals within a band under test, there being a total of m sampling points, and making all Tn form a matrix T, T being a two-dimensional matrix with a scale of n×m:

$$T = \begin{bmatrix} T_1 \\ T_2 \\ \cdot \\ \cdot \\ T_n \end{bmatrix};$$

S2. making the cell phone lens approach the object under test, acquiring, by using the focal plane detector, the intensity signal of the reflected light from the object under test, in this case, a detector pixel response value corresponding to the $n^{th}$ filtering channel being In, and making all In form a matrix I, I being a one-dimensional matrix:

$$I = \begin{bmatrix} I_1 \\ I_2 \\ \cdot \\ \cdot \\ I_n \end{bmatrix}; \text{ and}$$

S3. calculating a matrix S of a spectrum of the object under test by using the following formula:

$$S = T^{-1} \cdot I,$$

where S is a one-dimensional matrix with a length of m and represents a reflectivity of the object under test at a different wavelength.

As a further improvement to the present invention, m is greater than or equal to n.

As a further improvement to the present invention, the spectral filter array is integrated in one row or one column at the edge of the Bayer filter.

As a further improvement to the present invention, the spectrometer further includes a lighting system for illuminating the object under test during measurement.

As a further improvement to the present invention, the lighting system is a cell phone flash.

As a further improvement to the present invention, the data processing system is a cell phone processor.

As a further improvement to the present invention, a wavelength range of the on-chip integrated cell phone spectrometer is 0.4 μm to 0.8 μm.

As a further improvement to the present invention, a quantity of filtering channels is 10 to 10000.

The present invention further provides a cell phone, integrated with any foregoing on-chip integrated cell phone spectrometer.

The beneficial effects of the invention are as follows:

For the on-chip integrated cell phone spectrometer in the present invention, the spectral filter array is integrated into the focal plane detector to form the spectrometer, no complex and huge dispersive element and system are required, and the structure is compact. The spectral filter array only needs to be integrated at an edge of an original Bayer filter of a focal plane detector, no additional accessory is required, and the original photographing function of a cell phone is not affected. Advantages such as a high level of integration, a fast response, and a good spectral resolution are provided.

The above description is only an overview of the technical solutions of the present invention. For a clearer understanding of the technical measure of the present invention and implementation according to the content of the specification, and to make the above and other objectives, features, and advantages of the present invention clearer and more comprehensible, detailed description is provided as follows with reference to preferred embodiments and the accompanying drawings.

BRIEF DESCRIPTION OF THE DRAWINGS

FIG. 6 shows a second arrangement manner of a spectral filter array according to a preferred embodiment of the present invention.

Figure 1:
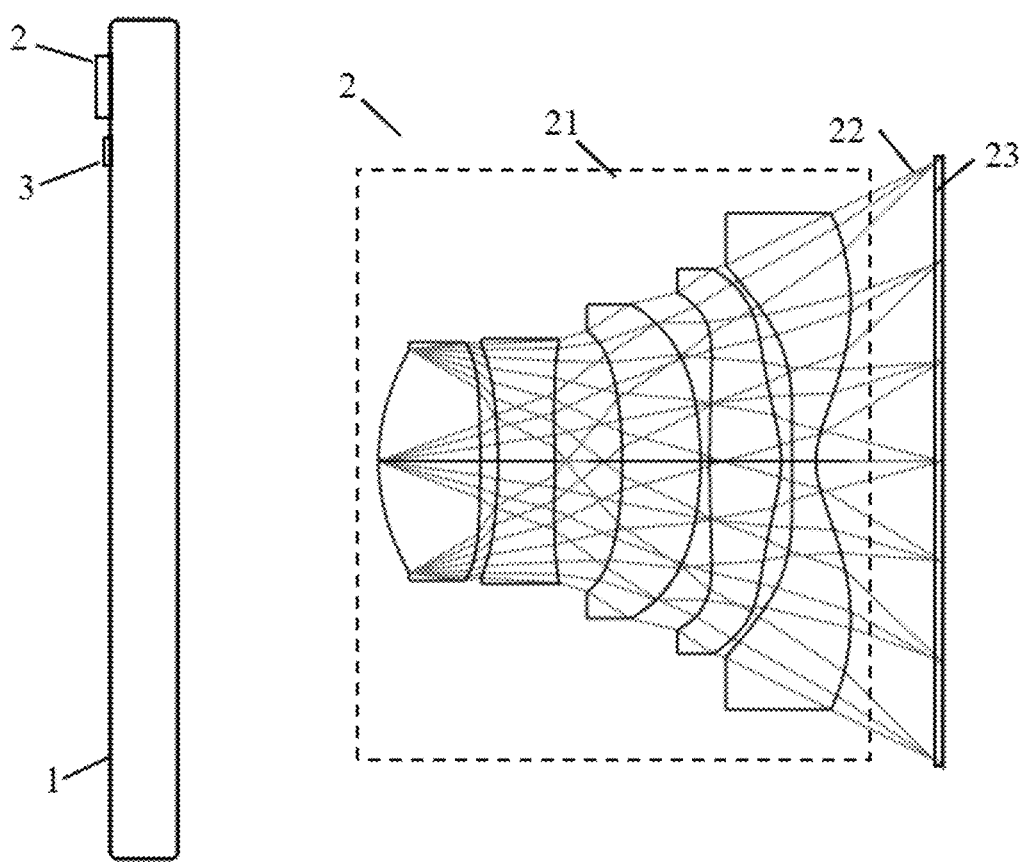
FIG. 1 is a schematic structural diagram of an on-chip integrated cell phone spectrometer according to a preferred embodiment of the present invention.

Reference numerals: 1. cell phone; 2. detection system; 21. cell phone lens; 22. reflected light ray; 23. focal plane detector; 231. Bayer filter; 232. spectral filter array; and 3. cell phone flash.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 2:
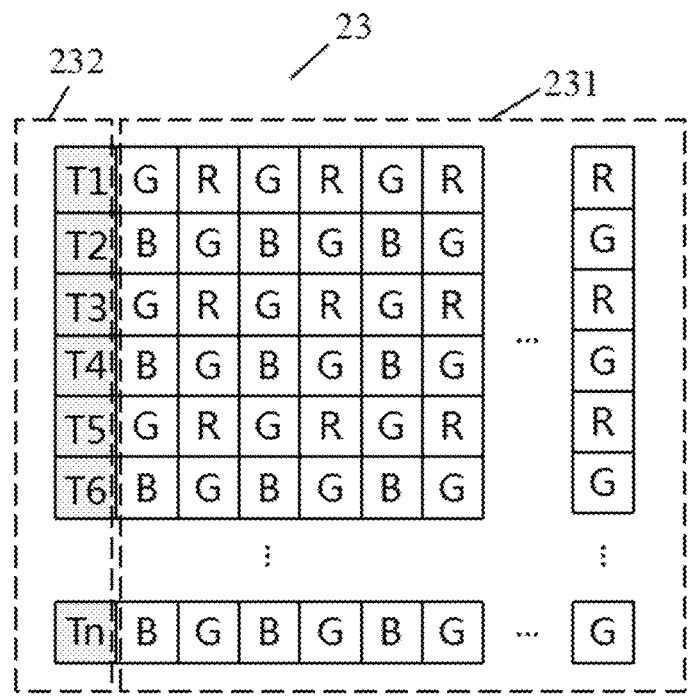
FIG. 2 is a schematic structural diagram of a focal plane detector integrated with a Bayer filter and a spectral filter array according to a preferred embodiment of the present invention.

FIG. 1 and FIG. 2 show an on-chip integrated cell phone spectrometer according to a preferred embodiment of the present invention. The spectrometer includes:

a detection system 2, including a cell phone lens 21 and a focal plane detector 23 integrated with a Bayer filter 231; and a spectral filter array 232, integrated at an edge of the Bayer filter 231, the spectral filter array 232 including a plurality of filtering channels with different spectral transmittances, each filtering channel corresponding to one or more detector pixels, for example, 1×1, 2×2, 3×3 or 10×10 pixels.

The cell phone lens 21 is configured to acquire a reflected light 22 from an object under test. The focal plane detector 23 is configured to acquire an intensity signal of the reflected light 22. After different intensity signals corresponding to different filtering channels are obtained, a data processing system performs spectral reconstruction to obtain spectral data of the object under test.

Optionally, the spectrometer further includes a lighting system for illuminating the object under test during measurement. Preferably, the lighting system is a cell phone flash 3.

Optionally, the data processing system is a cell phone processor.

The spectral reconstruction includes the following steps.

S1. Measure a spectral filter transmittance, a transmittance of an $n^{th}$ filtering channel being Tn, Tn being a function of a transmittance with respect to a wavelength, perform sampling at equal wavelength intervals within a band under test, there being a total of m sampling points, and make all Tn form a matrix T, T being a two-dimensional matrix with a scale of n×m:

$$T = \begin{bmatrix} T_1 \\ T_2 \\ \cdot \\ \cdot \\ T_n \end{bmatrix}.$$

Figure 3:
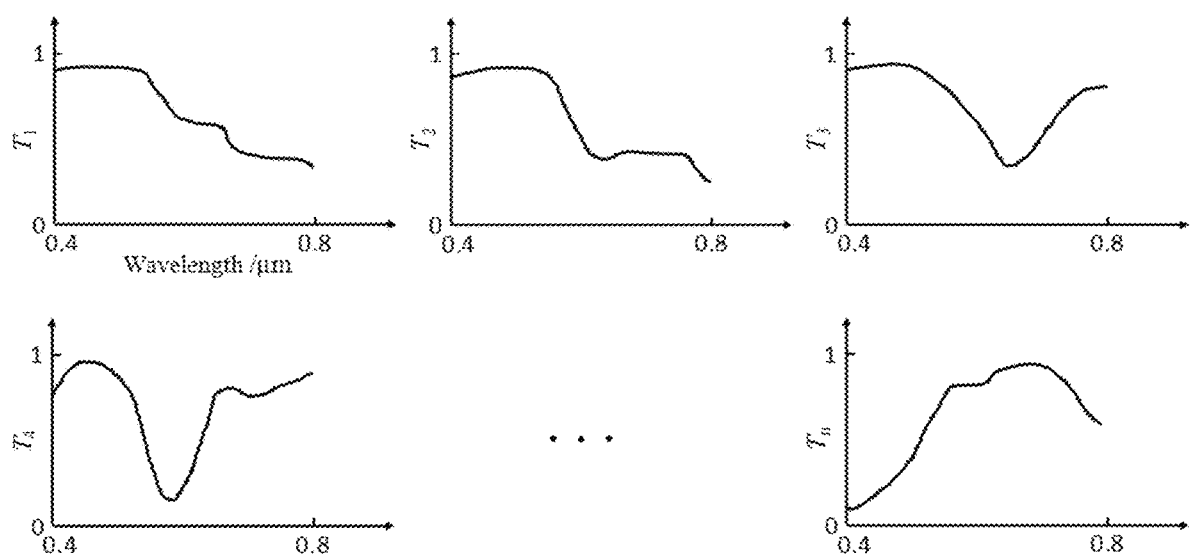
FIG. 3 shows a curve of a transmittance of a spectral filter array according to a preferred embodiment of the present invention.
Figure 4:
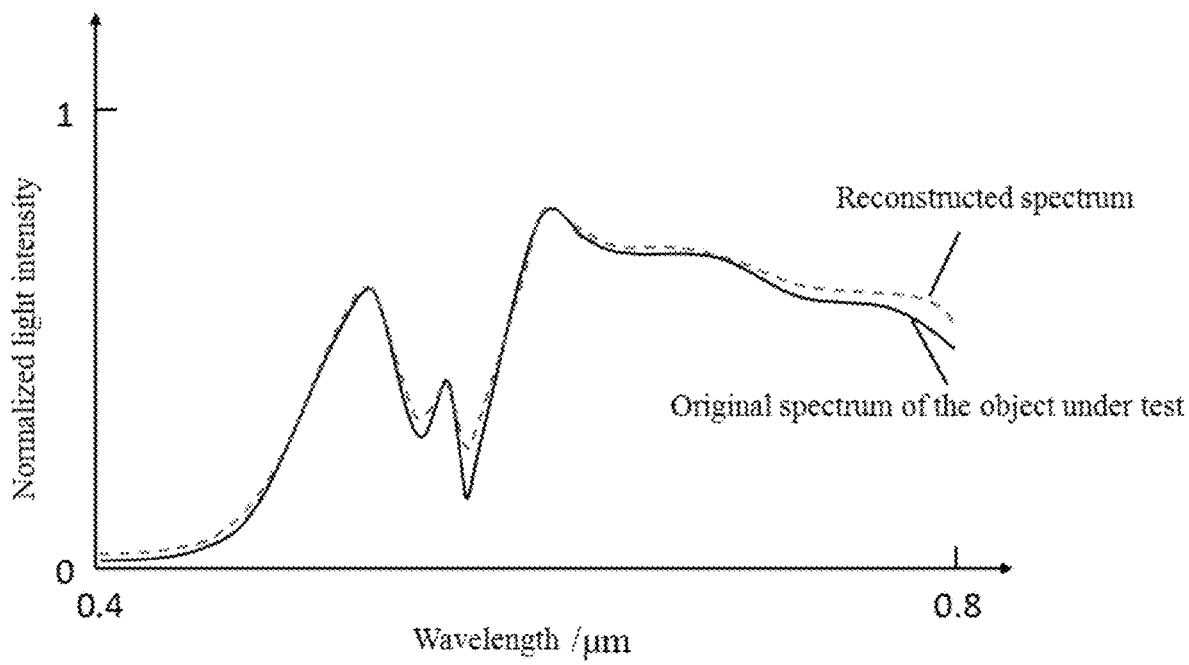
FIG. 4 shows a curve of an original spectrum and a curve of a reconstructed spectrum of an object under test according to a preferred embodiment of the present invention.

In an embodiment, a curve of a transmittance of a spectral filter array is shown in FIG. 3. The array has a total of 50 filtering channels. That is, n=50. A designed wavelength range of the spectrometer is 0.4 μm to 0.8 μm. Each filtering channel has a different transmittance. Within a bandwidth range, a quantity of wavelength sampling points of a transmittance function is 50. That is, m=50. A transmittance matrix formed by the spectral filter array is:

$$T = \begin{bmatrix} T_1 \\ T_2 \\ \cdot \\ \cdot \\ T_{50} \end{bmatrix}.$$

S2. Make the cell phone lens approach the object under test, acquire, by using the focal plane detector, the intensity signal of the reflected light from the object under test, in this case, a detector pixel response value corresponding to the $n^{th}$ filtering channel being In, and make all In form a matrix I, I being a one-dimensional matrix:

$$I = \begin{bmatrix} I_1 \\ I_2 \\ \cdot \\ \cdot \\ I_n \end{bmatrix}.$$

In an embodiment, 50 response values form a matrix:

$$I = \begin{bmatrix} I_1 \\ I_2 \\ \cdot \\ \cdot \\ I_{50} \end{bmatrix}.$$

S3. Calculate a matrix S of a spectrum of the object under test by using the following formula:

$$S = T^{-1} \cdot I,$$

where S is a one-dimensional matrix with a length of m and represents a reflectivity of the object under test at a different wavelength. A process that the reflected light from the object under test passes through a spectral filter to be acquired by a detector pixel may be represented as I=T·S. In comparison, if T is known and I is measured, the spectrum of the object under test may be calculated by using the foregoing formula.

m is greater than or equal to n.

Optionally, the spectral filter array 232 is integrated in one row or one column at the edge of the Bayer filter 231.

Figure 5:
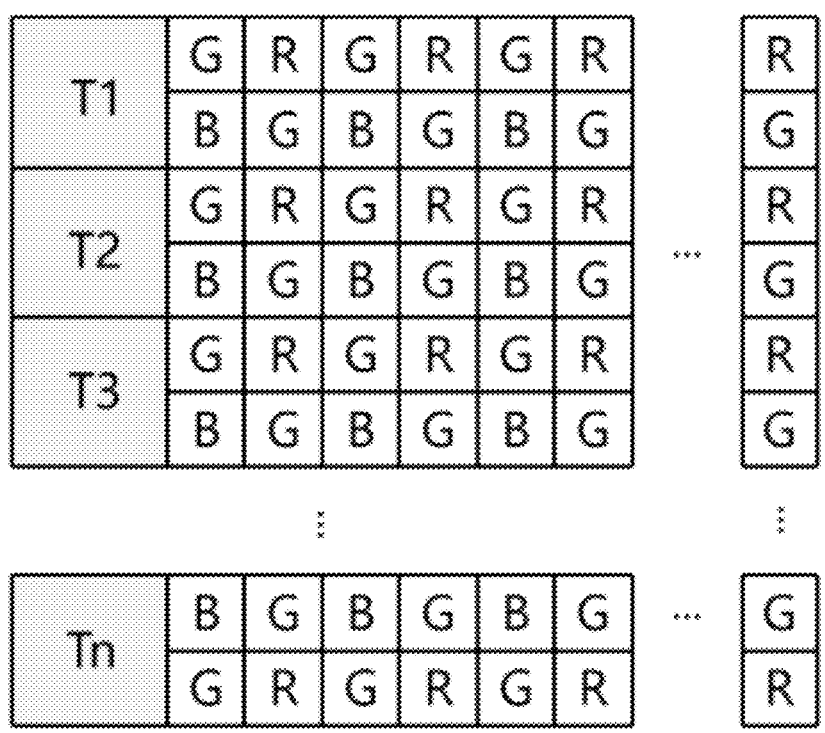
FIG. 5 shows a first arrangement manner of a spectral filter array according to a preferred embodiment of the present invention.

As shown in FIG. 5, the spectral filter array 232 is integrated in one column at the edge of the Bayer filter 231. One spectral filtering channel corresponds to 2×2 detector pixels.

Figure 6:
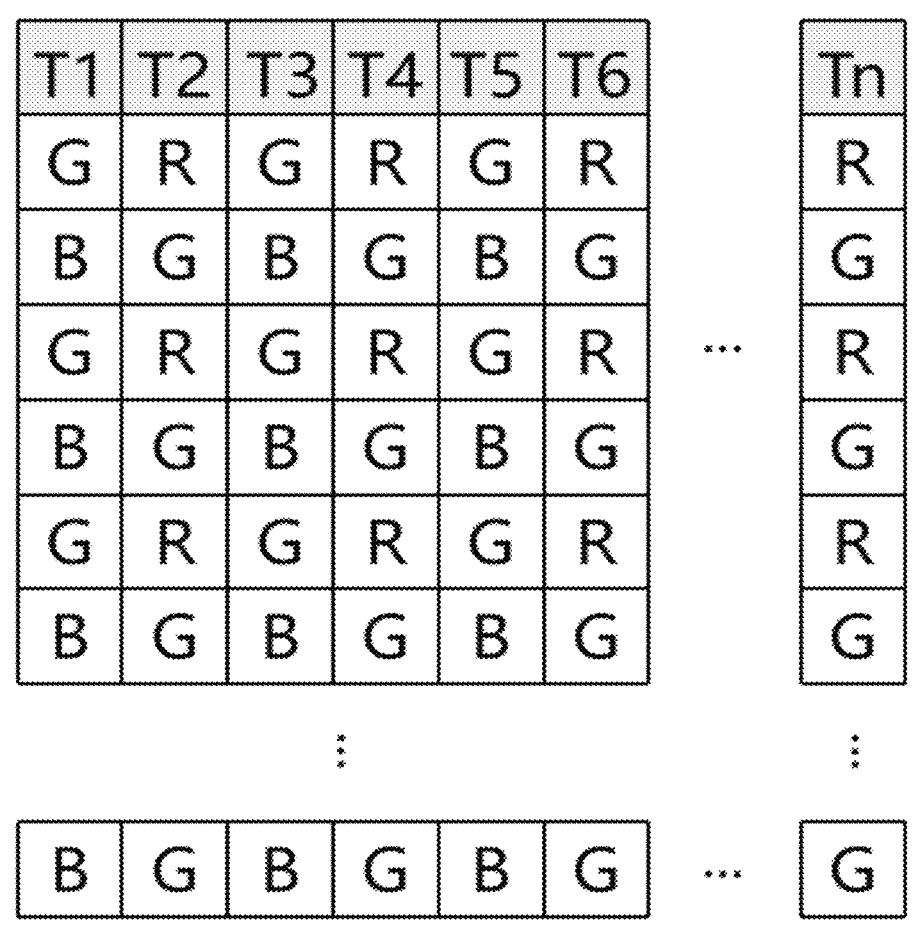

As shown in FIG. 6, the spectral filter array 232 is integrated in one column at the edge of the Bayer filter 231.

Optionally, a quantity of filtering channels is 10 to 10000.

In the present invention, spectral measurement and a cell phone lens are independent of each other. Only data of pixels corresponding to the spectral filter array is used during spectral measurement. Only data of pixels corresponding to the Bayer filter is used during photographing.

The invention also provides a cell phone in a preferred embodiment of the present invention, the cell phone includes the on-chip integrated cell phone spectrometer in any foregoing embodiment.

In the present invention, the spectral filter array is integrated into the focal plane detector to form the spectrometer, no complex and huge light splitting element and system are required, and the structure is compact. The spectral filter array only needs to be integrated at an edge of an original Bayer filter of a focal plane detector, no additional accessory is required, and the original photographing function of a cell phone is not affected.

In the present invention, an original flash of a cell phone is used as a lighting system, and a cell phone lens is used as a light collecting system. The cell phone is used as a data processing system. Therefore, the compatibility with the cell phone is high, and the cost is low. A spectral test can be performed anywhere and anytime, so that the present invention is particularly applicable to routine life and has great application prospect.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. An on-chip integrated cell phone spectrometer, comprising:
   a detection system, comprising a cell phone lens and a focal plane detector integrated with a Bayer filter; and
   a spectral filter array, integrated at an edge of the Bayer filter, the spectral filter array comprising a plurality of filtering channels with different spectral transmittances, each filtering channel corresponding to one or more detector pixels, wherein
   the cell phone lens is configured to acquire a reflected light from an object under test, the focal plane detector is configured to acquire an intensity signal of the reflected light ray, and after different intensity signals corresponding to different filtering channels are obtained, a data processing system performs spectral reconstruction to obtain spectral data of the object under test; and a spectral measurement and the cell phone lens are independent of each other; only data of detector pixels corresponding to the spectral filter array is used during the spectral measurement; only data of detector pixels corresponding to the Bayer filter is used during photographing.

2. The on-chip integrated cell phone spectrometer according to claim 1, wherein the spectral filter array is integrated in one row or one column at the edge of the Bayer filter.

3. The on-chip integrated cell phone spectrometer according to claim 1, further comprising a lighting system for illuminating the object under test during measurement.

4. The on-chip integrated cell phone spectrometer according to claim 3, wherein the lighting system is a cell phone flash.

5. The on-chip integrated cell phone spectrometer according to claim 1, wherein the data processing system is a cell phone processor.

6. The on-chip integrated cell phone spectrometer according to claim 1, wherein a wavelength range of the on-chip integrated cell phone spectrometer is 0.4 µm to 0.8 µm.

7. The on-chip integrated cell phone spectrometer according to claim 1, wherein a quantity of filtering channels is 10 to 10000.

8. A cell phone, including the on-chip integrated cell phone spectrometer according to claim 1.

* * * * *